United States Patent
Sugiyama et al.

(10) Patent No.: US 9,784,336 B2
(45) Date of Patent: Oct. 10, 2017

(54) DAMPER DEVICE FOR VEHICLE

(71) Applicants: Masataka Sugiyama, Toyota (JP); Hiroaki Kimura, Toyota (JP); Akitaka Ichikawa, Nissin (JP); Masaru Ebata, Chita (JP); Tomohiro Saeki, Anjo (JP); Tsutomu Sekine, Kariya (JP); Hiroaki Suezaki, Anjo (JP)

(72) Inventors: Masataka Sugiyama, Toyota (JP); Hiroaki Kimura, Toyota (JP); Akitaka Ichikawa, Nissin (JP); Masaru Ebata, Chita (JP); Tomohiro Saeki, Anjo (JP); Tsutomu Sekine, Kariya (JP); Hiroaki Suezaki, Anjo (JP)

(73) Assignees: TOYOTA JIDOSHA KABUSHIKI KAISHA, Toyota-Shi (JP); AISIN SEIKI KABUSHIKI KAISHA, Kariya-Shi (JP)

(*) Notice: Subject to any disclaimer, the term of this patent is extended or adjusted under 35 U.S.C. 154(b) by 0 days.

(21) Appl. No.: 14/412,260

(22) PCT Filed: Sep. 18, 2013

(86) PCT No.: PCT/IB2013/002176
§ 371 (c)(1),
(2) Date: Dec. 31, 2014

(87) PCT Pub. No.: WO2014/053899
PCT Pub. Date: Apr. 10, 2014

(65) Prior Publication Data
US 2015/0184718 A1    Jul. 2, 2015

(30) Foreign Application Priority Data

Oct. 1, 2012 (JP) ................................ 2012-219302

(51) Int. Cl.
*F16D 3/14* (2006.01)
*F16F 15/139* (2006.01)

(52) U.S. Cl.
CPC ......... *F16F 15/139* (2013.01); *Y10S 903/904* (2013.01)

(58) Field of Classification Search
CPC ........................ F16F 15/139; Y10S 903/904
(Continued)

(56) References Cited

U.S. PATENT DOCUMENTS 4,573,945 A * 3/1986 Kajitani ............ F16F 15/12366
192/213.31
4,698,045 A * 10/1987 Billet .................. F16F 15/1202
464/64.1 X
(Continued)

FOREIGN PATENT DOCUMENTS

JP    2002-106640 A    4/2002
JP    2005-265164 A    9/2005
(Continued)

*Primary Examiner* — Gregory Binda
(74) *Attorney, Agent, or Firm* — Andrews Kurth Kenyon LLP

(57) ABSTRACT

In a positive torsion angle region in which a torque is transmitted from an engine side, a small hysteresis torque is generated at all times. Therefore, torsional vibrations of a small amplitude occurring during idle operation can be effectively attenuated by the small hysteresis torque, without switching to a large hysteresis torque, for example, during idle operation of the engine. As a result, the driver can be prevented from feeling uncomfortable due to switching to a large hysteresis torque during idle operation, and drivability can therefore be improved.

4 Claims, 7 Drawing Sheets

(58) Field of Classification Search
USPC .............. 464/68.4, 68.41, 160; 192/213.11, 192/213.12, 213.21, 213.22, 213.3, 192/213.31, 214, 214.1
See application file for complete search history.

(56) References Cited

U.S. PATENT DOCUMENTS

| | | | |
|---|---|---|---|
| 4,729,465 A | 3/1988 | Reik | |
| 9,091,304 B2 * | 7/2015 | Takenaka | F16F 15/129 464/68.4 |
| 2002/0039925 A1 | 4/2002 | Uehara | |

FOREIGN PATENT DOCUMENTS

| | | |
|---|---|---|
| JP | 2006-029363 A | 2/2006 |
| JP | 2012-001102 A | 1/2012 |

* cited by examiner

DAMPER DEVICE FOR VEHICLE

CROSS-REFERENCE TO RELATED APPLICATIONS

This is a national phase application based on the PCT International Patent Application No. PCT/IB2013/002176 filed Sep. 18, 2013, claiming priority to Japanese Patent Application No. 2012-219302 filed Oct. 1, 2012, the entire contents of both of which are incorporated herein by reference.

BACKGROUND OF THE INVENTION

1. Field of the Invention

The invention relates to a damper device for a vehicle that is provided between an engine and a drive unit incorporating a motor-generator, and more particularly to a technique for setting an optimum hysteresis torque.

2. Description of Related Art

A configuration is available in which a hysteresis mechanism generating a hysteresis torque is provided in a damper device for a vehicle that is installed between an engine and a drive unit incorporating a motor-generator and transmits power while absorbing torque fluctuations generated by the engine. For example, such a damper device is described in Japanese Patent Application Publication No. 2006-29363 (JP 2006-29363 A). In the damper device described in JP 2006-29363 A, a technique is used by which when a relative torsion angle in the torsion in the positive direction in which the torque is transmitted from the engine side is equal to or less than a predetermined value, a small hysteresis torque is generated, whereas when the relative torsion angle exceeds the predetermined value, a large hysteresis torque is generated, and in the case of torsion in the negative direction in which the torque is transmitted from the drive unit side, a large hysteresis torque is generated.

However, for example, during idle operation of the engine, since small torsional vibrations are generated, it is desirable that the vibrations be attenuated by a small hysteresis torque. For this purpose, in the damper device described in JP 2006-29363 A, vibrations occurring during idle operation and the booming sound occurring during normal engine operation are attenuated by generating a small hysteresis torque when the relative torsion angle is equal to or less than a predetermined value in the torsion in the positive direction in which the torque is transmitted from the engine side. However, in the damper device described in JP 2006-29363 A, since switching between a small hysteresis torque and a large hysteresis torque is performed on the basis of the relative torsion angle, a large hysteresis torque can be generated when a small hysteresis torque, such as that during idle operation or normal engine operation, is desired, and the driver can feel uncomfortable.

SUMMARY OF THE INVENTION

The invention provides a damper device for a vehicle that can generate an optimum hysteresis torque according to the operation state.

The first aspect of the invention resides in a damper device for a vehicle. The damper device is provided with a first hysteresis mechanism and a second hysteresis mechanism. The first hysteresis mechanism is configured to generate a predetermined first hysteresis torque. The second hysteresis mechanism is configured to generate a second hysteresis torque that is larger than the first hysteresis torque. The first and second hysteresis mechanisms can be provided between an engine and a power transmission device equipped with a motor-generator. The first and second hysteresis mechanisms generate the first hysteresis torque in a positive torsion angle region in which a torque is transmitted from an engine side, and the first and second hysteresis mechanism generate the second hysteresis torque in a negative torsion angle region in which a torque is transmitted from a power transmission device side.

With such a configuration, in the positive torsion angle region in which the torque is transmitted from the engine side, a small hysteresis torque is generated at all times. Therefore, switching to a large hysteresis torque is not performed, for example, during idle operation or normal engine operation, and torsional vibrations of a small amplitude occurring during idle operation and the booming sound occurring during normal engine operation can be effectively attenuated by the small hysteresis torque. As a result, the driver is prevented from feeling uncomfortable due to switching to a large hysteresis torque during idle operation or normal engine operation, and drivability can therefore be improved.

In the damper device, when a torsion angle is less than a predetermined angle in the negative torsion angle region, the first and second hysteresis mechanisms may generate a hysteresis torque that is less than a hysteresis torque generated when the torsion angle is equal to or greater than the predetermined angle. In such a case, torsional vibrations of a small frequency and a large amplitude are generated in the negative torsion angle region during start-stop control of the engine, but those vibrations can be attenuated by the generation of a large hysteresis torque. Meanwhile, during idle operation, torsional vibrations of a small amplitude are generated, but those torsional vibrations can be effectively attenuated by the generation of a small hysteresis torque.

In the damper device, the predetermined angle may be set to an angle which is a half of torsion angle fluctuations during idle operation of the engine. In such a case, vibrations occurring during idle operation can be attenuated with good efficiency.

The damper, device may include a pair of disk plates capable of rotating about a rotation axis, a hub capable of rotating about the rotation axis, and an elastic member disposed between each of the disk plates and the hub, the elastic member connecting the disk plate and the hub so as to transmit power, and the second hysteresis mechanism may be configured such that a friction element provided at the outer circumferential end portion of the hub slides along the disk plate in response to variations in a torsion angle. With such a configuration, when a large hysteresis torque is generated, the large hysteresis torque can be generated with a simple structure that requires no spring or the like.

In the damper device, the disk plates may have a notch, and a part of the disk plate that slides along the friction element in the second hysteresis mechanism may be defined by the notch, the part of the disk plate inclines toward a friction element side. In such a case, the mechanism enabling sliding of the disk plate and the friction element can be easily configured by forming the disk plates such that are inclined toward the friction element side.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the present description, the torsion angle of the damper device when a torque is transmitted from the engine side, that is, when a positive torque is transmitted, is defined as a positive torsion angle, and the torsion angle of the damper device when a torque is transmitted from the drive unit side, that is, when a negative torque is transmitted, is defined as a negative torsion angle.

Further, in the present description, a large torsion angle in a negative torsion angle region means that the absolute value of the torsion angle in the negative direction is large, and a small torsion angle means that the torsion angle is close to zero.

The embodiments of the invention will be explained below in greater detail with reference to the appended drawings. In the embodiments below, the drawings are simplified or changed, as appropriate, and the aspect ratios and shapes of components are not necessarily depicted accurately.

Figure 1:
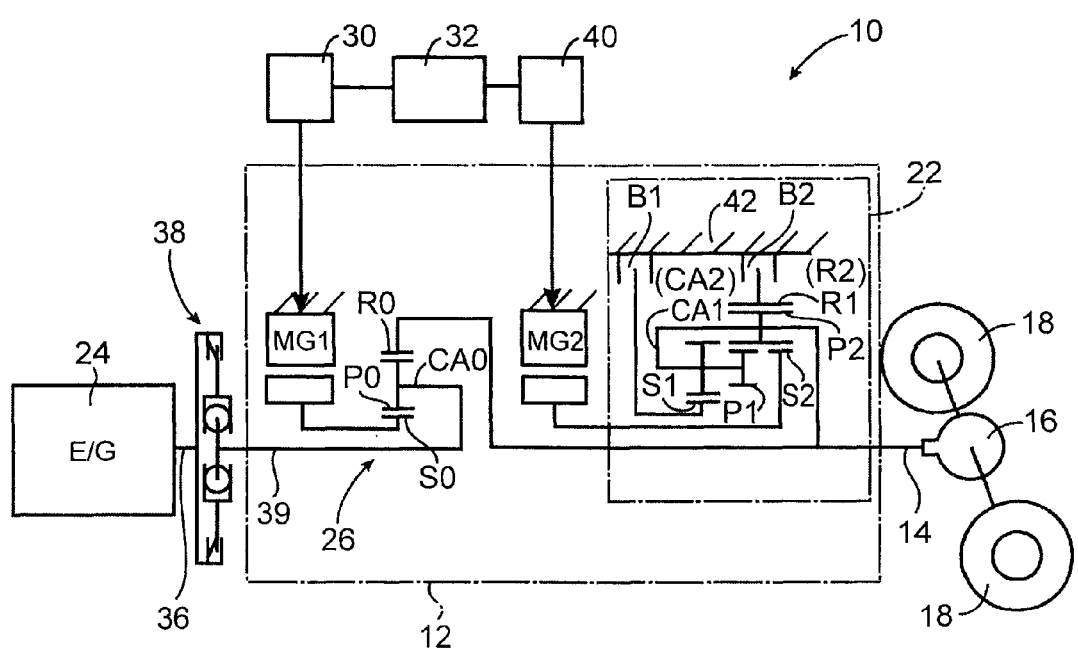
FIG. 1 is a schematic configuration diagram illustrating a drive device for a hybrid vehicle using the invention.

FIG. 1 is a schematic configuration diagram illustrating a vehicular drive device 10 for a hybrid vehicle using the invention. The vehicular drive device 10 is configured to include an engine 24, a power transmission device 12, and a below-described damper device 38 provided between the engine 24 and the power transmission device 12. In the vehicular drive device 10 shown in FIG. 1, the torque of the engine 24, which is the main drive source, is transmitted to a wheel-side output shaft 14 through the below-described damper device 38 and a planetary gear device 26, and the torque is transmitted from the wheel-side output shaft 14 to a pair of left and right drive wheels 18 through a differential gear device 16. Further, the vehicular drive device 10 is also provided with a second motor-generator MG2 capable of selectively executing the power running control for outputting the drive power for running and the regeneration control for recovering energy, and this second motor-generator MG2 is connected by an automatic transmission 22 to the wheel-side output shaft. Therefore, the output torque transmitted from the second motor-generator MG2 to the wheel-side output shaft is increased or decreased according to a shift ratio γs (a ratio of the revolution speed Nmg2 of the second motor-generator MG2 to the revolution speed Nout of the wheel-side output shaft) that is set in the automatic transmission 22.

The automatic transmission 22 introduced in the power transmission path between the second motor-generator MG2 and the drive wheels 18 is configured to be capable to establishing a plurality of stages with the shift ratio γs greater than "1", and during running in which a torque is outputted from the second motor-generator MG2, the automatic transmission can increase the torque and transmit it to the wheel-side output shaft. Therefore, the second motor-generator MG2 is configured to have a lower capacity or a smaller size. As a result, for example, when the revolution speed Nout of the wheel-side output shaft increases as the vehicle speed rises, the shift ratio γs is reduced and the revolution speed Nmg2 of the second motor-generator MG2 (referred to hereinbelow as "second motor-generator revolution speed") is decreased in order to maintain good operation efficiency of the second motor-generator MG2, and when the revolution speed Nout of the wheel-side output shaft decreases, the shift ratio γs is increased and the second motor-generator revolution speed Nmg2 is increased.

The power transmission device 12 is equipped with a first motor-generator MG1 and the second motor-generator MG2 and transmits the torque of the engine 24 to the drive wheels 18. The engine 24 is a conventional internal combustion engine in which power is outputted as a result of fuel combustion, such as a gasoline engine or a diesel engine, and which is configured such that the operation state thereof, such as the throttle valve opening degree, intake air amount, fuel supply amount, and ignition timing, is electrically controlled by an electronic control unit for engine control (E-ECU) (not shown in the figure) including a microcomputer as the main component. Detection signals from an accelerator depression amount sensor AS that detects the depression amount of an accelerator pedal, a brake sensor BS for detecting whether a brake pedal is operated, and the like are supplied to the electronic control unit.

The first motor-generator MG1 (motor-generator) is, for example, a synchronous motor that is configured to demonstrate selectively the function of an electric motor that generates a drive torque and the function of a generator and is connected through an inverter 30 to a power storage device 32 such as a battery or a capacitor. The output torque of the first motor-generator MG1 or the regenerated torque of the first motor-generator MG1 is adjusted or set by controlling the inverter 30 with an electronic control unit for motor-generator control (MG-ECU) (not shown in the figure) including a microcomputer as the main component.

The planetary gear device 26 is a conventional planetary gear device of a single pinion type that performs a differential action and includes the following three rotating elements: a sun gear S0, a ring gear R0 disposed on a circle concentric with the sun gear S0, and a carrier CA0 that supports a pinion gear P0 meshing with the sun gear S0 and the ring gears R0 so that the pinion gear can rotate and revolve. The planetary gear device 26 is provided concentrically with the engine 24 and the automatic transmission 22. The planetary gear device 26 and the automatic transmission 22 are configured symmetrically with respect to a central line. Therefore, in FIG. 1, the lower half thereof is omitted.

In the present embodiment, a crankshaft 36 of the engine 24 is connected to the carrier CA0 of the planetary gear device 26 through the damper device 38 (the vehicular damper device of the invention) and a power transmission shaft 39. The sun gear S0 is connected to the first motor-generator MG1, and the ring gear R0 is connected to the wheel-side output shaft. The carrier CA0 functions as an input element, the sun gear S0 functions as a reaction element, and the ring gear R0 functions as an output element.

Where a reaction torque created by the first motor-generator MG1 is inputted to the sun gear S0 with respect to the output torque of the engine 24 inputted to the carrier CA0 in the planetary gear device 26, a direct transmission torque appears in the ring gear R0 serving as the output element. Therefore, the first motor-generator MG1 functions as a generator. Further, when the revolution speed of the ring gear R0, that is, the revolution speed (output shaft revolution speed) Nout of the wheel-side output shaft 14, is constant, the revolution speed (engine revolution speed) Ne of the engine 24 can be continuously (stepless) changed by increasing or decreasing the revolution speed Nmg1 of the first motor-generator MG1.

The automatic transmission 22 of the present embodiment is configured by a set of Ravigneaux planetary gear mechanisms. Thus, the automatic transmission 22 is provided with a first sun gear S1 and a second sun gear S2, a large-diameter section of a stepped pinion P1 meshes with the first sun gear S1, a small-diameter section of the stepped pinion P1 meshes with a pinion P2, and the pinion P2 meshes with a ring gear R1 (R2) disposed concentrically with the sun gears S1, S2. The pinions P1, P2 are held by a common carrier CA1 (CA2), so that the pinions can rotate and revolve. The second sun gear S2 meshes with the pinion P2.

The second motor-generator MG2 (motor-generator) is controlled through the inverter 40 by the MG-ECU, whereby the motor-generator is caused to function as a motor or a generator and the assist output torque or regenerated torque is adjusted or set. The second sun gear S2 is connected to the second motor-generator MG2, and the carrier CA1 is connected to the wheel-side output shaft. The first sun gear S1 and the ring gear R1 constitute, together with the pinions P1, P2, a mechanism corresponding to a planetary gear device of a double pinion type, and the second sun gear S2 and the ring gear R1 constitute, together with the pinion P2, a mechanism corresponding to a planetary gear device of a single pinion type.

Further, the automatic transmission 22 is provided with a first brake B1 provided between the first sun gear S1 and a housing 42, which is a non-rotating member, in order to fix selectively the first sun gear S1, and a second brake B2 provided between the ring gear R1 and the housing 42 in order to fix selectively the ring gear R1. Those brakes B1, B2 are the so-called friction engagement devices that generate a brake force by a friction force. A multiplate-type engagement device or a band-type engagement device can be used therefor. Those brakes B1, B2 are configured such that the torque capacity thereof varies continuously in response to the engagement pressure generated by a hydraulic actuator for the brake B1 and a hydraulic actuator for the brake B2, which are hydraulic cylinders or the like.

In the automatic transmission 22 configured in the above-described manner, the second sun gear S2 functions as an input element and the carrier CA1 functions as an output element. The transmission is also configured such that where the first brake B1 is engaged, a high-speed stage H with a shift ratio γsh larger than "1" is established, and where the second brake B2 is engaged instead of the first brake B1, a low-speed stage L with a shift ratio γsl larger than the shift ratio γsh of the high-speed stage H is established. Thus, the automatic transmission 22 is a two-stage transmission and shifting between the shift stages H and L is executed on the basis of the running state such as the vehicle speed V and required drive power (or accelerator depression amount). More specifically, the shift stage regions are mapped in advance (shifting diagram), and the control is performed to set a shift stage according to the detected operation state.

Figure 2:
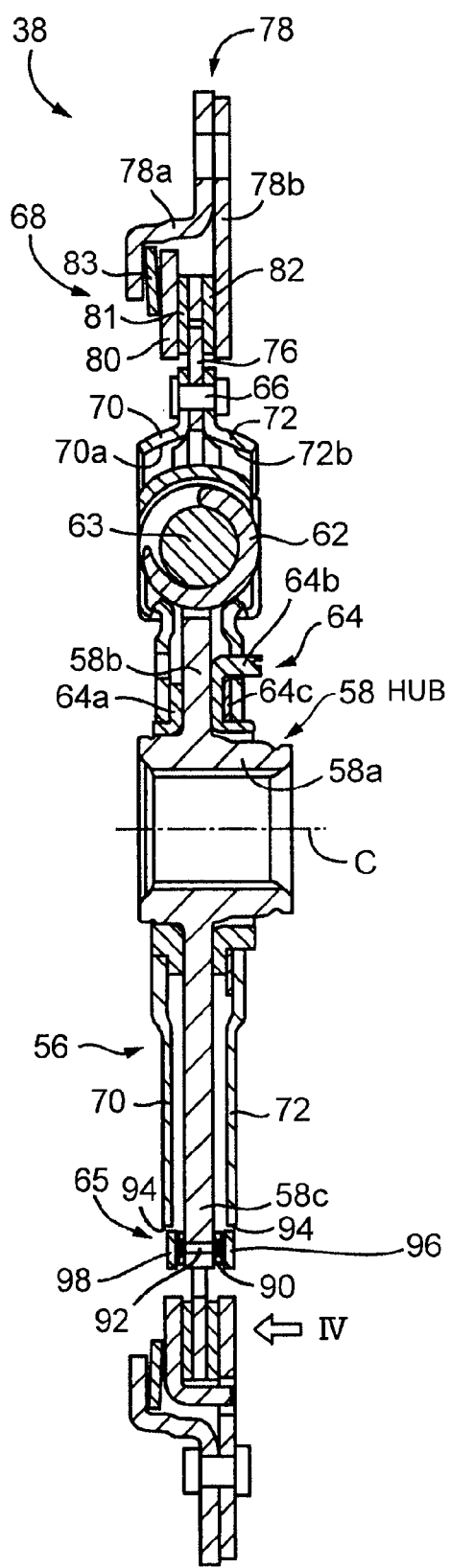
FIG. 2 is a cross-sectional view illustrating in detail the configuration of the damper device shown in FIG. 1.

FIG. 2 is a cross-sectional view illustrating in detail the configuration of the damper device 38 shown in FIG. 1. The damper device 38 is provided to be capable of transmitting power between the engine 24 and, the planetary gear device 26, with the rotation axis C taken as a center. The power transmission shaft 39 shown in FIG. 1 is spline-mated to the inner circumferential portion of the damper device 38.

The damper device 38 is configured to include a pair of disk plates 56 rotatable about the rotation axis C, a hub 58 capable of rotating with respect to the disk plates 56 about the same rotation axis C, coil springs 62 formed of a spring steel and inserted between the disk plates 56 and the hub 58 so as to connect the disk plates 56 and the hub 58 such that power can be transmitted therebetween, cushions 63 incorporated inside the coil springs 62, a first hysteresis mechanism 64 that generates a small hysteresis torque H1 between the disk plates 56 and the hub 58, a second hysteresis mechanism 65 that is provided at the outer circumferential end portion of the hub 58 and generates a large hysteresis torque H2 between the disk plates 56 and the hub 58, and a torque limiter mechanism 68 provided on the outer circumferential side of the disk plates 56. The coil springs 62 can be regarded as an example of the elastic member of the invention, the first hysteresis mechanism 64 can be regarded as an example of the first hysteresis mechanism generating a small hysteresis torque (first hysteresis torque) of the invention, and the second hysteresis mechanism 65 can be regarded as an example of the second hysteresis mechanism generating a large hysteresis torque (second hysteresis torque) of the invention.

The disk plates 56 are constituted by a pair of left and right disk-shaped first disk plate 70 (referred to hereinbelow as the first plate 70) and second disk plate 72 (referred to hereinbelow as the second plate 72) and are fastened together at the outer circumferential portions with a rivet 66 that prevents the disk plates from rotating relative to each other in a state in which the coil springs 62 and the hub 58 are inserted axially between the plates 70, 72. The rivet 66 also functions as a fastening member of a lining plate 76 which is a constituent component of the below-described torque limiter mechanism 68. A plurality of first open orifices (first openings) 70a for accommodating the coil springs 62 is formed in the circumferential direction in the first plate 70. Further, a plurality of second open orifices (second openings) 72a for accommodating the coil springs 62 is formed in the circumferential direction in the second plate 72 at positions corresponding to the first open orifices 70a. A plurality of coil springs 62 is accommodated with an equiangular spacing in the spaces formed by the first open orifices 70a and the second open orifices 72a. As a result, where the disk plates 56 rotate about the rotation axis C, the coil springs 62 also likewise revolve about the rotation axis C. The round columnar cushion 63 is accommodated inside each of the coil springs 62. The first plate 70 and the second plate 72 constitute a pair of disk plates of the invention.

The hub 58 is constituted by a cylindrical section 58a provided with inner circumferential teeth spline-mated with the power transmission shaft 39 at the inner circumferential portion, a disk-shaped flange section 58b extending radially outward from the outer circumferential surface of the cylindrical section 58a, and a plurality of protruding sections 58c further protruding radially outward from the flange section 58b. The coil springs 62 are inserted into spaces formed between the protruding sections 58c in the rotation direction. As a result, where the hub 58 rotates about the rotation axis C, the coil springs 62 also revolve likewise abound the rotation axis C. With such a configuration, the coil springs 62 transmit power while deforming elastically according to the relative rotation amount between the members of the disk plates 56 and the hub 58. For example, where the disk plates 56 rotate, one end of the coil springs 62 is pushed and the other end of the coil springs 62 pushes the protruding sections 58c of the hub 58, thereby rotating the hub 58. In this case, since the coil springs 62 transmit power while deforming elastically, the shocks caused by torque fluctuations are absorbed by the coil springs 62.

The first hysteresis mechanism 64 is provided between the disk plates 56 and the flange section 58b of the hub 58 in the axial direction on the inner circumferential side of the coil springs 62. The first hysteresis mechanism 64 is configured to include a first member 64a inserted between the first plate 70 and the flange section 58b, a second member 64b inserted between the second plate 72 and the flange section 58b, and a plate spring 64c inserted in a preloaded state between the second member 64b and the second plate 72 and pressing the second member 64b against the flange section 58b side. Relative rotation of the first member 64a and the first plate 70 is prevented by mating part of the first member 64a with a notch formed in the first plate 70. Relative rotation of the second member 64b and the second plate 72 is prevented by mating part of the second member 64b with a notch formed in the second plate 72. When the hub 58 and the disk plate 56 slide in the first hysteresis mechanism 64 configured in the above-described manner, a friction force is generated between the flange section 58b and the first plate 70 and the second plate 72, thereby generating a hysteresis torque. Further, the first hysteresis mechanism 64 is designed such that the small hysteresis torque H1 (small hysteresis torque) of a comparatively small size is generated at all times in the region with a positive torsion angle and the region with a negative torsion angle. This small hysteresis torque H1 is useful in attenuating the torsional vibrations of a comparatively small amplitude that are generated during idle operation or normal engine operation.

The torque limiter mechanism 68 is provided on the outer circumferential side of the disk plates 56 and has a function of preventing the transmission of a torque that exceeds a limit torque Tlim that has been set in advance. The torque limiter mechanism 68 is configured to include an annular disk-shaped lining plate 76 that rotates together with the disk plates 56 as a result of being fastened to the disk plates 56 by the rivet 66, a support plate 78 that is disposed on the outer circumferential side and can rotate about the rotation axis C, an annular disk-shaped pressure plate 80 that is disposed on the inner circumferential side of the support plate 78 and can rotate about the rotation axis C, a first friction material 81 inserted between the pressure plate 80 and the lining plate 76, a second friction material 82 inserted between the lining plate 76 and the support plate 78, and a cone-shaped plate spring 83 inserted in a preloaded state between the pressure plate 80 and the support plate 78.

The support plate 78 is constituted by a disk-shaped first support plate 78a and a disk-shaped second support plate 78b, and bolt holes for bolt fastening (not shown in the figure) designed for fixing a flywheel (not shown in the figure) and the support plates 78a, 78b are formed in the outer circumferential portions of the support plate. A space is formed between the first support plate 78a and the second support plate 78b by bending the inner circumferential portion of the first support plate 78a in the axial direction. The plate spring 83, pressure plate 80, first friction material 81, lining plate 76, and second friction material 82 are accommodated in the order of description in the axial direction from the first support plate 78a to the second support plate 78b in this space.

The lining plate 76 is an annular disk-shaped member with the inner circumferential portion thereof being fixed together with the first plate 70 and the second plate 72 by the rivet 66. The pressure plate 80 is likewise formed in an annular disk shape. The first friction material 81 is inserted between the pressure plate 80 and the lining plate 76. The first friction material 81 is formed, for example, in an annular disk shape. Alternatively, it may be formed as circular arc segments (pieces) which are disposed with equiangular spacing in the circumferential direction. The first friction material 81 is attached to the lining plate 76 side, but may be also attached to the pressure plate 80 side.

Further, the second friction material 82 is inserted between the inner circumferential portion of the second support plate 78b and the lining plate 76. The second friction material 82 is formed, for example, in an annular disk shape similarly to the first friction material 81. Alternatively, the second friction material may be formed as circular arc segments (pieces) which are disposed with equiangular spacing in the circumferential direction. The second friction material 82 is attached to the lining plate 76 side, but may be also attached to the second support plate 78b side.

The plate spring 83 is inserted in a preloaded state between the first support plate 78a and the pressure plate 80. The plate spring 83 is formed in a cone-like shape, the inner circumferential end portion thereof is abutted against the pressure plate 80, the outer circumferential portion thereof is abutted against the first support plate 78a, and the plate spring is inserted after being deformed to a deflection amount that generates the preloading (plate spring load W). Therefore, the plate spring 83 pushes the pressure plate 80 in the axial direction by the plate spring load W toward the lining plate 76 side. The limit torque Tlim is set to a target value by adjusting friction coefficients $\mu$ of the friction surface between the pressure plate 80 and the first friction material 81 and the friction surface between the second support plate 78b and the second friction material 82, the working radius r of the friction materials 81, 82, and the plate spring load W of the plate spring 83. Where a torque exceeding the limit torque Tlim is inputted to the torque limiter mechanism 68, slip occurs at the friction surface between the pressure plate 80 and the first friction material 81 and the friction surface between the second support plate 78b and the second friction material 82, and the transmission of torque exceeding the limit torque Tlim is prevented.

Figure 3:
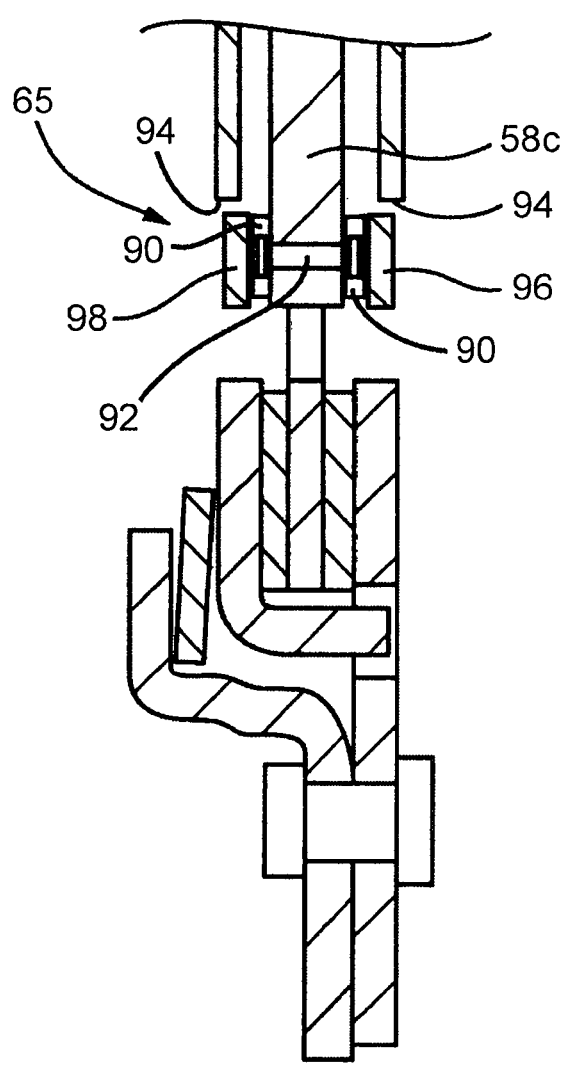
FIG. 3 is an enlarged sectional view of part of the damper device shown in FIG. 2.
Figure 4:
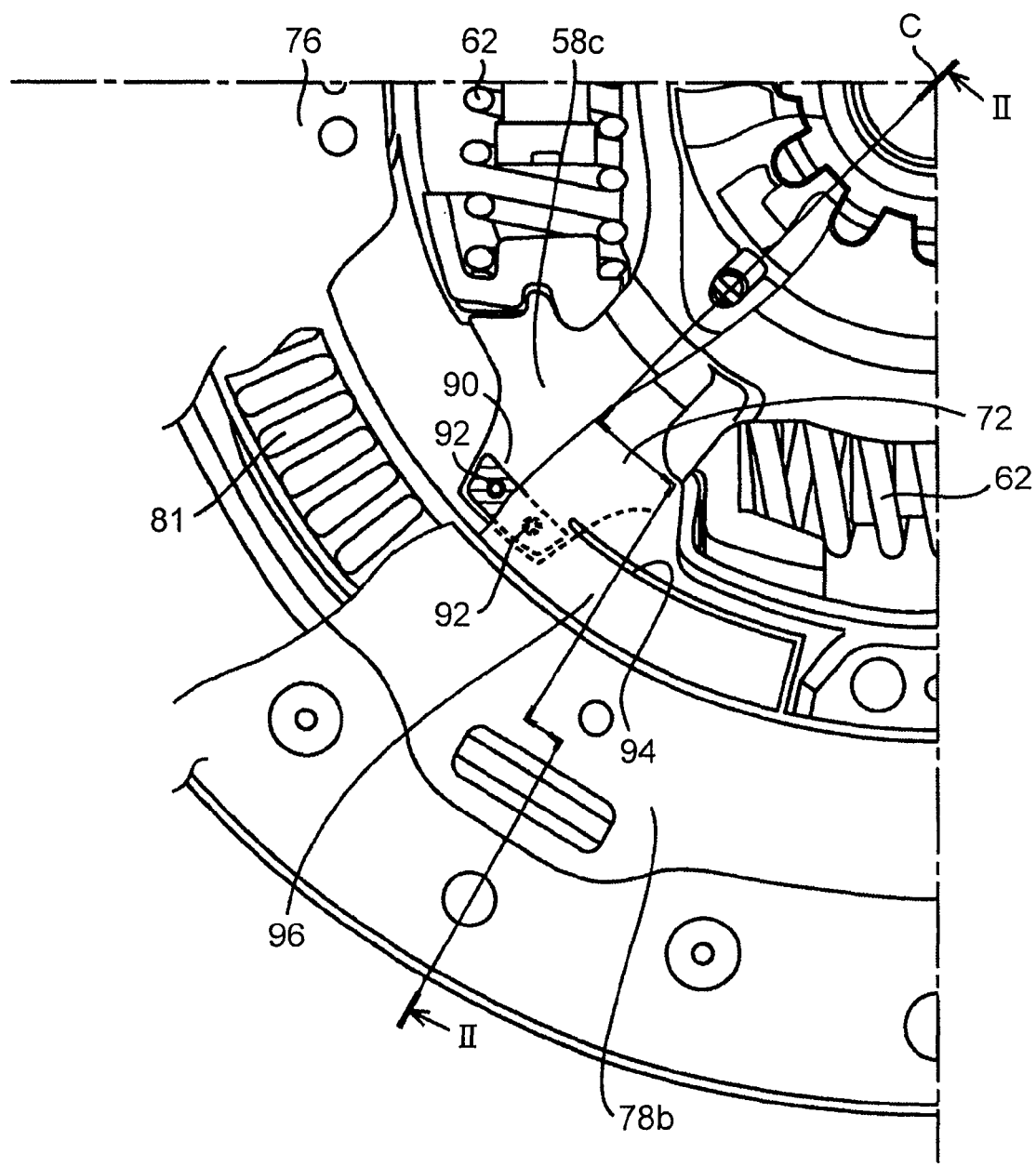
FIG. 4 is an arrow IV view of the damper device shown in FIG. 2 which is taken from the arrow IV direction, a part thereof being cut out.

The second hysteresis mechanism 65 is provided at the outer circumferential section of the hub 58 and the disk plate 56 and generates a large hysteresis torque H2, which is larger than the small hysteresis torque H1 generated by the first hysteresis mechanism 64, by generating sliding resistance (friction force) therebetween. FIG. 3 is an enlarged view of the periphery of the second hysteresis mechanism 65 in the damper device 38 shown in FIG. 2. FIG. 4 is an arrow IV view of the damper device 38 shown in FIG. 2 which is taken from the arrow IV direction, a part thereof being cut out. Part of FIG. 4 is shown as a transparent view. As shown in FIGS. 2 to 4, friction plates 90 of a rectangular shape (piece shape) constituted, for example, by a resin material, are fixed by a rivet 92 at both surfaces substantially parallel to the disk plate 56 on the outer circumferential side of the protruding sections 58c of the hub 58. The II-II section shown in FIG. 4 corresponds to the cross-sectional view in FIG. 2. The friction plate 90 corresponds to the friction element of the invention.

Further, as shown in FIG. 4, an L-shaped notch 94 extending from an outer circumferential end portion to the inner circumferential side and then formed from the inner circumferential portion along the circumferential direction (rotation direction) is formed in the second plate 72. As a result of the notch 94 being formed, a fan-shaped cantilever section 96 parallel to the rotation direction is defined in the second plate 72. The cantilever section 96 is formed at the same position in the radial direction as the site where the friction plate 90 of the protruding section 58c is fixed. Further, the cantilever section 96 is formed to be inclined with a predetermined slope S toward the hub 58 side (friction plate 90 side) along the rotation direction. Therefore, where the hub 58 and the second plate 72 rotate relative to each other and a predetermined torsion angle is reached, the friction plate 90 and the cantilever section 96 abut against each other and start sliding in parallel with the compression of the coil spring 62. As shown in FIGS. 2 and 3, a cantilever section 98 (not shown in FIG. 4) of the same shape as the second plate 72 is also formed in the first plate 70. The cantilever sections 96, 98 can be regarded as an example of parts sliding along the friction element of the invention.

Figure 5A:
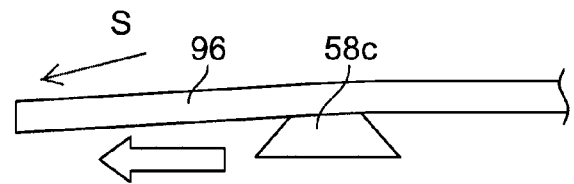
FIGS. 5A-5B are further simplified views mainly of the periphery of the cantilever section of the second plate in the damper device shown in FIG. 4.
Figure 5B:
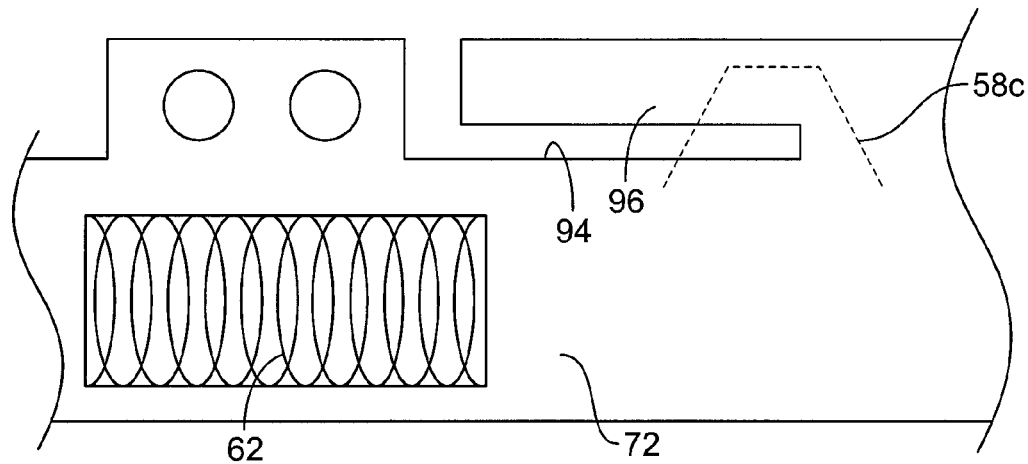

FIGS. 5A-5B are further simplified views mainly of the periphery of the cantilever section 96 of the second plate 72 in the damper device 38 shown in FIG. 4. The second plate 72 actually has a disk-like shape, but FIGS. 5A-5B show the second plate 72 expanded into a linear shape. Therefore, although the protruding section 58c of the hub 58 shown by a broken line actually likewise rotates about the rotation axis C, in FIGS. 5A-5B it moves linearly (left-right direction in FIGS. 5A-5B). Further, FIG. 5A is a side surface view of the cantilever section 96 and the protruding section 58c shown below. In FIGS. 5A-5B, the friction plate 90 fixed to the protruding section 58c is omitted.

As follows from the side surface view in FIGS. 5A-5B, the cantilever section 96 is inclined at a predetermined slope S. Therefore, where the protruding section 58c (hub 58) and the second plate 72 are rotated relative to each other and the protruding section 58c moves to a position overlapping, in the rotation direction, the cantilever section 96 (where the protruding section 58c and the cantilever section 96 overlap when viewed from the axial direction), the protruding section 58c and the second plate 72 are caused to slide against each other. More specifically, where the protruding section 58c moves to the left relative to the second plate 72 in FIGS. 5A-5B, the protruding section 58c and the cantilever section 96 abut against each other as a result of the cantilever section 96 being formed obliquely, and the hub 58 is caused to slide along the cantilever section 96, while being pressed thereagainst, according to variations in the torsion angle θ. Further, in FIGS. 4 and 5, the cantilever section 96 of the second plate 72 is shown, but similar sliding is realized also by the cantilever section 98 of the first plate 70.

Where the protruding section 58c and the cantilever sections 96, 98 are thus caused to slide, a friction force is generated between the friction plate 90 fixed to the protruding section 58c and the cantilever sections 96, 98, and a large hysteresis torque H2 correspond thereto is generated. Thus, the cantilever sections 96, 98 have functions of both the plate springs and the sliding members in the conventional hysteresis mechanism. This large hysteresis torque H2 is set to the target hysteresis torque H2 by adjusting the plate thickness of the friction plate 90 and the hub 58, a gap between the first plate 70 and the second plate 72, the shape of the notches formed in the first plate 70 and the second plate 72, and the slope S (inclination angle) of the cantilever sections 96, 98 of the first plate 70 and second plate 72, thereby adjusting the pushing load acting against the friction plate 90. Further, the torsion angle θ from which the hysteresis torque H2 starts being generated can be also adjusted, as appropriate, by adjusting the notch shape and the slope S of the cantilever sections 96, 98. Furthermore, since the second hysteresis mechanism 65 is disposed on the outer circumferential side in the radial direction with respect to the first hysteresis mechanism 64, the large hysteresis torque H2 which is larger than the small hysteresis torque H1 can be generated.

Figure 6:
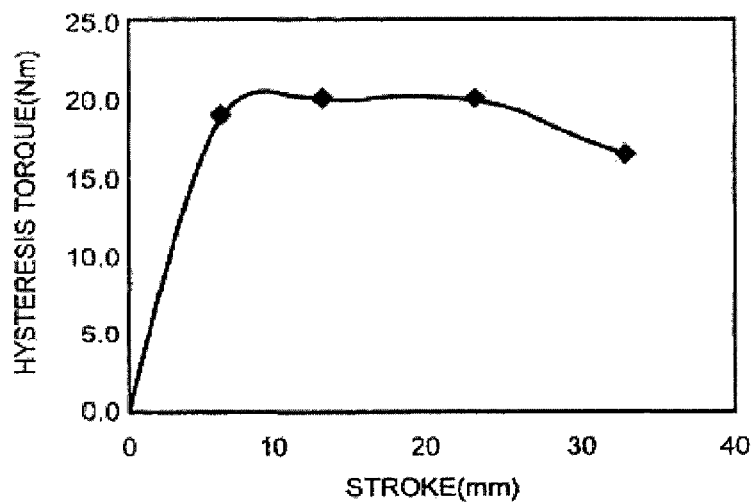
FIG. 6 shows the relationship between the value of hysteresis torque and the stroke of the hub in the damper device shown in FIG. 2.

FIG. 6 shows the relationship between the hysteresis torque (Nm) and the stroke (mm) obtained by setting, as appropriate, the shape of the notches in the first plate 70 and second plate 72 and the slope S of the cantilever sections 96, 98. The stroke (mm) corresponds to the movement amount when the protruding section 58 c in FIGS. 5A-5B moves to the left relative to the second plate 72 (the same is for the first plate 70), in order words, corresponds to the torsion angle θ of the damper device 38. In FIG. 6, the hysteresis torque assumes a substantially constant value regardless of the stroke value. Thus, by adjusting the abovementioned parameters, it is possible to generate a substantially constant hysteresis torque regardless of the torsion angle θ of the damper device 38. The abovementioned hysteresis torque characteristic is an example, and the hysteresis torque characteristic can be freely adjusted by adjusting the above-described parameters. For example, the hysteresis torque can be changed linearly or non-linearly with respect to the stroke.

The second hysteresis mechanism 65 of the present embodiment is set such that when a torque is transmitted from the drive device side, that is, a large hysteresis torque H2 is generated in the negative torsion angle region. Thus, the settings are such that when a torque is transmitted from the drive device side, the friction plate 90 slides along the cantilever sections 96, 98. The settings are also such that in the positive torsion angle region in which a torque is transmitted from the engine side, the friction plate 90 and the cantilever sections 96, 98 do not slide along each other.

For example, where the settings are such that when a torque is transmitted from the drive device side (negative torsion angle region), the hub 58 rotates counterclockwise in FIG. 4 (in FIGS. 5A-5B, the protruding section 58 c moves to the left), the cantilever section 96 and the friction plate 90 are caused to slide according to variations in the torsion angle θ. Meanwhile, where the settings are such that when a torque is transmitted from the engine side (positive torsion angle region), the hub 58 rotates clockwise in FIG. 4 (in FIGS. 5A-5B, the protruding section 58 c moves to the right), the friction plate 90 is separated from the cantilever section 96 and, therefore, the cantilever section 96 and the friction plate 90 do not slide even when the torsion angle θ changes. Therefore, in the positive torsion angle region in which a torque is transmitted from the engine side, the large hysteresis torque H2 produced by the second hysteresis mechanism 65 is not generated, and the large hysteresis torque H2 produced by the second hysteresis mechanism 65 is generated in the negative torsion angle region in which a torque is transmitted from the drive device side.

Figure 7:
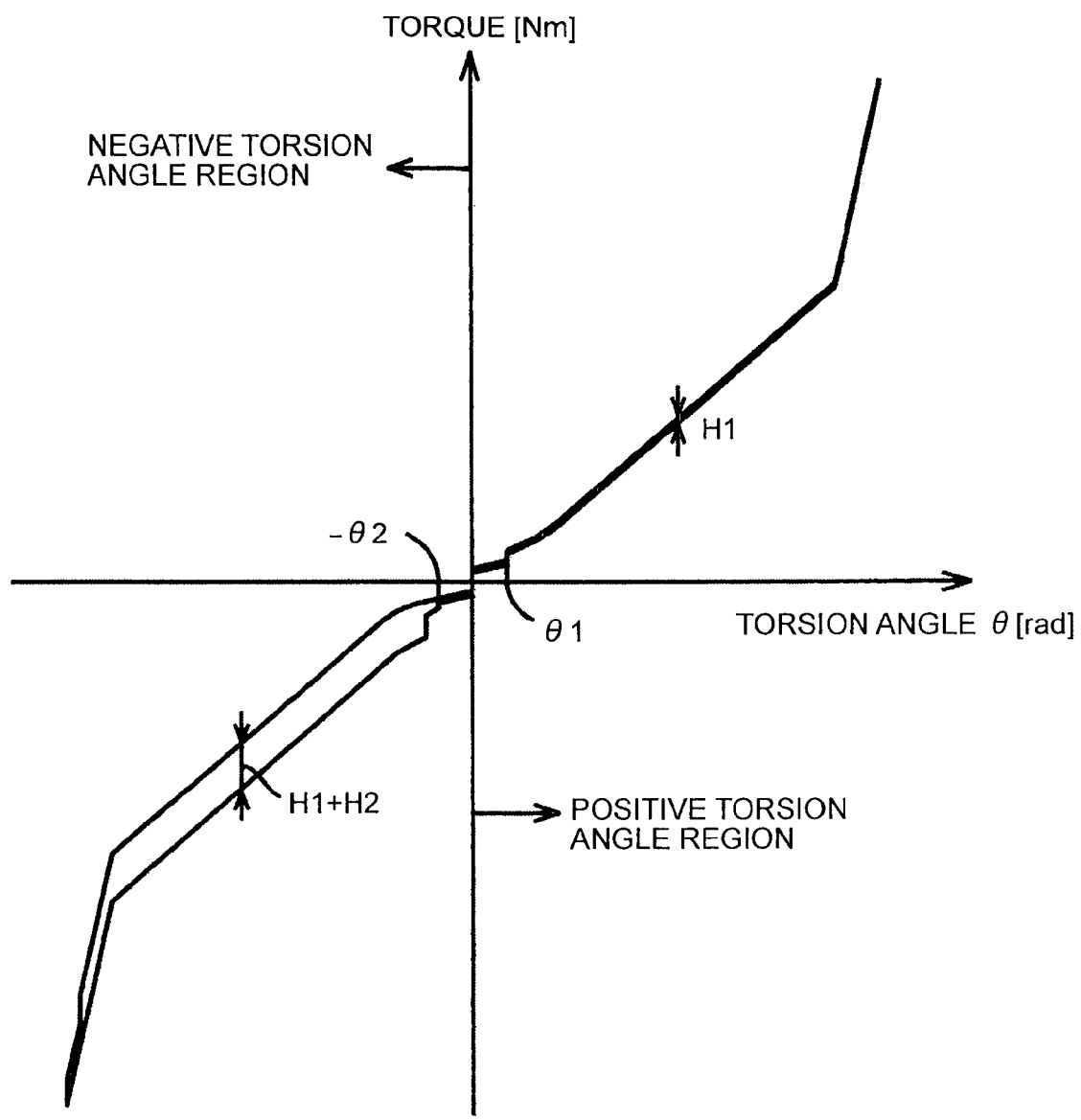
FIG. 7 shows the torsion characteristic of the damper device shown in FIG. 2.

FIG. 7 shows the torsion characteristic of the damper device 38 of the present embodiment. In this figure, torsion angle θ (rad) is plotted against the abscissa, and torque (Nm) is plotted against the ordinate. As shown in FIG. 7, in a region with a positive torsion angle θ, that is, in a region in which a torque is inputted from the engine side (positive torque region), the hysteresis torque decreases. This is because only the first hysteresis mechanism 64 operates, and the second hysteresis mechanism 65 does not operate, as described hereinabove. Meanwhile, in a region with a negative torsion angle θ, that is, in a region in which a torque is inputted from the drive wheel side (negative torque region), the second hysteresis mechanism 65 operates and, therefore, the hysteresis torque attains a large value (H1+H2). Thus, in the negative torsion angle region, a large hysteresis torque (H1+H2) is generated, but in the damper device 38, the coil spring 62 is used such that has a release force (elastic recovery force) capable of returning the hub 58 to the original position (torsion angle is zero) against the resistance force of the hysteresis torque.

Further, in a negative torsion angle region with a comparatively small torsion angle θ in which the torsion angle θ is from a predetermined angle (−θ2) to zero, a miss angle is set at which the hysteresis torque decreases. More specifically, even in the negative torsion angle region, the hysteresis torque is reduced by settings such that the second hysteresis mechanism 65 does not operate in this region. Thus, the shape or position of the cantilever sections 96, 98 is adjusted such that the friction plate 90 and the cantilever sections 96, 98 do not slide and the friction force is not generated before the torsion angle θ reaches a predetermined angle (−θ2) in the second hysteresis mechanism 65. Therefore, the hysteresis torque generated in the torsion angle range (−θ2<θ<0) becomes the small hysteresis torque H1 created by the first hysteresis mechanism 64. The hysteresis torque H1 generated when the torsion angle θ is less than the predetermined angle (−θ2) in the negative torsion angle region is less than the hysteresis torque generated when the torsion angle θ is equal to or greater than the predetermined angle. The size of the torsion angle θ is determined by the absolute value of the torsion angle θ also in the negative torsion angle region. The predetermined angle (−θ2) is preferably set to an angle that is a half of torsion angle fluctuations during idle operation of the engine 24. This setting is done to enable the attenuation of torsional vibrations during idle operation, and the predetermined angle is set to a half of torsion angle fluctuations with consideration for the fact that fluctuations also occur in the positive torsion angle during idle operation.

Further, in the damper device 38, a total of four protrusions 58c of the hub 58 are formed in the circumferential direction, and the torsion angle θ at which the second hysteresis mechanism 65 starts operating can be also made to differ among the protruding sections 58c. As a result, the hysteresis torque can be changed to multiple stages according to the torsion angle θ. Further, the size of the hysteresis torque can be also made to differ for each hysteresis mechanism 65 to increase greatly the degree of freedom in setting the hysteresis torque.

Figure 8:
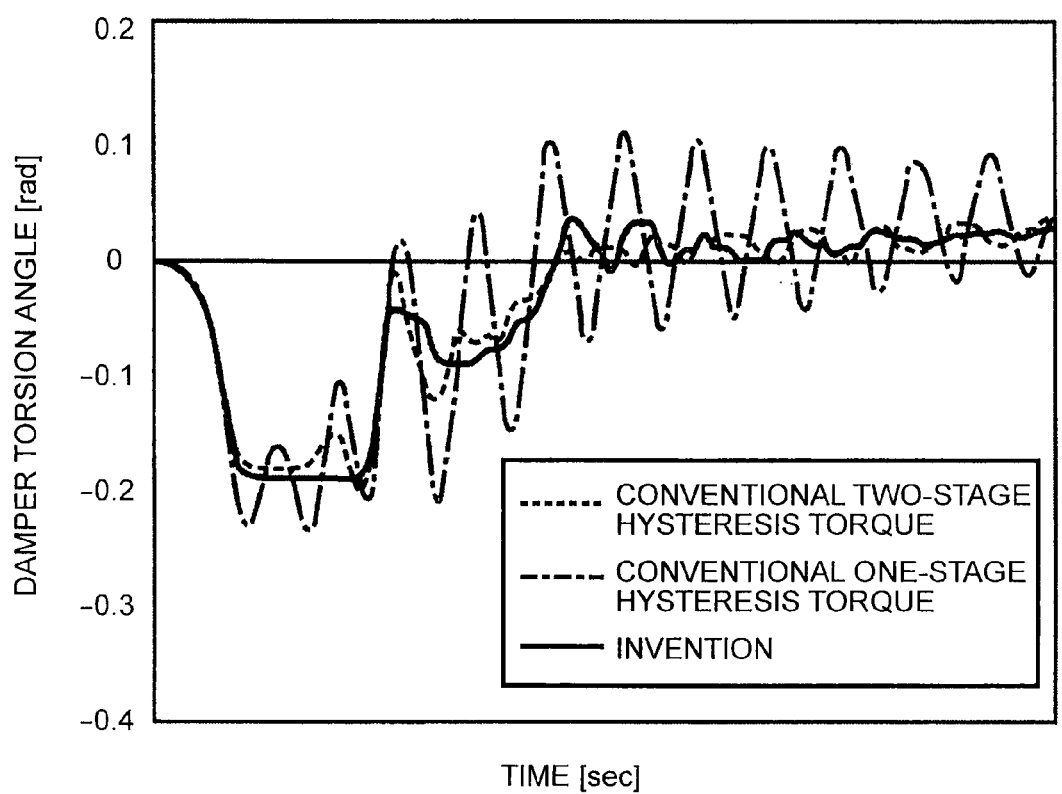
FIG. 8 illustrates damper behavior when the engine is started.

The effect demonstrated as a result of setting the torsion characteristic in the above-described manner is described below. FIG. 8 illustrates damper behavior observed when the engine is started. The elapsed time (sec) when the engine is started is plotted against the abscissa, and the torsion angle θ (rad) of the damper device is plotted against the ordinate. The broken line corresponds to the conventional damper device having a two-stage hysteresis torque, the dot-dash line corresponds to the conventional damper device having a one-stage hysteresis torque, and the solid line corresponds to the damper device 38 of the present embodiment.

When the engine is started, the engine 24 is revolved by a starter motor (first motor-generator MG1), that is, a torque is inputted from the drive wheel side, and the torsion angle θ is therefore in the negative region. In this case, the oscillations of the torsion angle θ also increase and, therefore, it is desirable that those oscillations be attenuated by generating a large hysteresis torque. Accordingly, in the damper device 38 of the present embodiment, the second hysteresis mechanism 65 is actuated in the negative region and the large hysteresis torque (H1+H2) is generated. As a result, the oscillations occurring when the engine is started are effectively attenuated, as shown by the solid line. Meanwhile, in the damper device having a one-stage hysteresis torque, which is shown by the dot-dash line, the oscillations of the torsion angle θ occurring when the engine is started are large and are practically not attenuated with the passage of time. Further, in the damper device having a two-stage hysteresis torque, which is shown by a broken line, the oscillations are less than in the damper device having a one-stage hysteresis torque, but are larger than in the damper device 38 of the present embodiment.

Further, in a region with a small torsion angle θ close to zero, the second hysteresis mechanism 65 is deactivated, thereby reducing the hysteresis torque (H1). With such settings, for example, during idle operation, it is desirable that the oscillations of the torsion angle θ be small and a small hysteresis torque be generated. Accordingly, since the torsion angle is also small (equal to or less than θ2) during idle operation, the second hysteresis mechanism 65 becomes inactive and a small hysteresis torque can be generated during idle operation. In a region on the high-frequency side of the resonance point, a problem is associated with the NV of the teeth knocking sound in the drive device 10 or the booming sound of the engine 24 occurring during normal engine operation, and it is desirable that a small hysteresis torque be also generated in such a high-frequency region. However, in the damper device 38, since a small hysteresis torque is generated at all times in the region with a positive torsion angle θ, the NV performance determined by the abovementioned booming sound or teeth knocking sound is also improved.

In the conventional damper device having a two-stage hysteresis torque, a small hysteresis torque is switched to a large hysteresis torque at a predetermined torsion angle θ, but since this switching is performed at a relative torsion angle, it is possible that switching to a large hysteresis torque be also performed when it is essentially desirable that a small hysteresis torque be generated. By contrast, in the damper device 38, such a malfunction can be also prevented because no actuation is performed by a relative torsion angle.

As mentioned hereinabove, in the present embodiment, in a positive torsion angle region in which a torque is transmitted from the engine 24 side, the small hysteresis torque H1 is generated at all times. Therefore, torsional vibrations of a small amplitude occurring during idle operation and the booming sound occurring during normal engine operation can be effectively attenuated by the small hysteresis torque H1, without switching to a large hysteresis torque H2, for example, during idle operation of the engine 24 or normal engine operation. As a result, the driver is prevented from being uncomfortable due to the switching to a large hysteresis torque during idle operation or during normal engine operation, and drivability can therefore be improved.

Further, in the present embodiment, torsional vibrations of a low frequency and a large amplitude are generated in the negative torsion angle region during start-stop control of the engine 24, but since a large hysteresis torque H2 is generated at this time, those vibrations can be attenuated. Meanwhile during idle operation or normal engine operation, torsional vibrations of a small amplitude are generated, but since the small hysteresis torque H1 is generated at this time, such torsional vibrations can be effectively attenuated.

Further, in the present embodiment, when the large hysteresis torque H2 is generated by the second hysteresis mechanism 65, the large hysteresis torque H2 can be generated with a simple structure, without using a spring or the like. Since the friction plate 90 is a piece-shaped member, the material yield can be also greatly improved.

Further, in the present embodiment, the mechanism enabling sliding of the disk plates 56 and the friction plate 90 can be easily configured by forming the disk plates 56 such that are inclined toward the friction plate 90 side.

Further, in the present embodiment, the hysteresis torque can be set to the target hysteresis torque H2 by adjusting the plate thickness of the friction plate 90 and the hub 58, a gap between the first plate 70 and the second plate 72, the shape of the notches formed in the first plate 70 and the second plate 72, and the slope S (inclination angle) of the cantilever sections 96, 98 of the first plate 70 and second plate 72, thereby adjusting the pushing load acting upon the friction plate 90. For example, a substantially constant hysteresis torque can be also generated with respect to the torsion angle θ.

Further, in the present embodiment, the second hysteresis mechanism 65 is constituted only by the friction plate 90 and the rivet stopping the friction plate. Therefore, the increase in the number of parts is inhibited.

The embodiment of the invention is explained in detail above with reference to the drawings, but the invention can be also carried out in other modes.

For example, in the present embodiment, the cantilever section is formed at the first plate 70 and also at the second plate 72, but a configuration may be also used in which the cantilever section is formed only at the first plate 70 or the second plate 72.

Further, in the present embodiment, the friction plate 90 is fixed with the rivet 92 to the protruding section 58c of the hub 58, but where the protruding section 58c of the hub 58 demonstrates by itself the function of the friction plate 90, a configuration in which the friction plate 90 is omitted may be used. Further, a method for fixing the friction plate 90 is not limited to riveting.

Further, in the present embodiment, the predetermined angle (−θ2) for switching from a small hysteresis torque to a large hysteresis torque in a negative torsion angle region is set to an angle that is a half of torsion angle fluctuations, for example, during idle operation of the engine 24, but this value is merely exemplary and may be changed as appropriate.

Further, in the present embodiment, the cantilever sections 96, 98 are formed at the disk plates 56, and a hysteresis torque is generated by causing sliding of those cantilever sections 96, 98 and the friction plate 90, but this arrangement may be changed, as appropriate, provided that a structure is used that generates a friction force between the friction plate 90 and the disk plate 56. For example, an inclined member can be attached to the surface of the disk plate 56.

Further, in the present embodiment, the automatic transmission 22 is provided, but a specific structure of the transmission is not limited to the automatic transmission 22 and can be changed, as appropriate, for example, to a transmission with a further increased number of stages or a belt-type continuously variable transmission. Furthermore, the transmission may not be provided.

Described hereinabove is merely one embodiment of the invention, and the invention can be embodied with various changes and modifications by a person skilled in the art.

The invention claimed is:

1. A vehicular driving device for a hybrid vehicle, comprising:
    an engine;
    a power transmission device equipped with a motor-generator;
    a damper device provided between the engine and the power transmission device equipped with the motor-generator, the damper device including a first hysteresis mechanism and a second hysteresis mechanism,
    the first hysteresis mechanism configured to generate a predetermined first hysteresis torque, such that only the first hysteresis torque is generated in a positive torsion angle region and in a region in a negative torsion angle region in which a torsion angle is greater than a predetermined angle,
    the second hysteresis mechanism configured to generate a second hysteresis torque that is larger than the first hysteresis torque, the second hysteresis mechanism being configured to generate the second hysteresis torque only in a region in which the torsion angle is larger in the negative direction than the negative predetermined angle in the region of the negative torsion angle and
    in a positive torsion angle region, the torque is transmitted from the engine side, and
    in the negative torsion angle region, the torque is transmitted from the power transmission device side.

2. The vehicular driving device according to claim 1, wherein
    the predetermined angle is set to an angle that is a half of torsion angle fluctuations during idle operation of the engine.

3. The vehicular driving device according to claim 1, further comprising:
    a pair of disk plates capable of rotating about a rotation axis;
    a hub capable of rotating about the rotation axis; and
    an elastic member disposed between each of the pair of disk plates and the hub, the elastic member configured to connect each of the pair of disk plates and the hub so as to transmit power, wherein
    the second hysteresis mechanism is configured such that a friction element provided at an outer circumferential end portion of the hub slides along each of the pair of disk plates in response to variations in a torsion angle.

4. The vehicular driving device according to claim 3, wherein
    the disk plates have a notch,
    a part of each of the pair of disk plates that slides along the friction element in the second hysteresis mechanism is defined by the notch, and
    the part of each of the pair of disk plates inclines toward a friction element side.

* * * * *